Nov. 15, 1960 A. A. LIMBERG 2,959,808
RECIPROCATING DOOR HINGE
Filed June 28, 1956 2 Sheets-Sheet 1

INVENTOR.
Alfons A. Limberg
BY
Paul Fitzpatrick
ATTORNEY

Nov. 15, 1960     A. A. LIMBERG     2,959,808
RECIPROCATING DOOR HINGE
Filed June 28, 1956     2 Sheets-Sheet 2
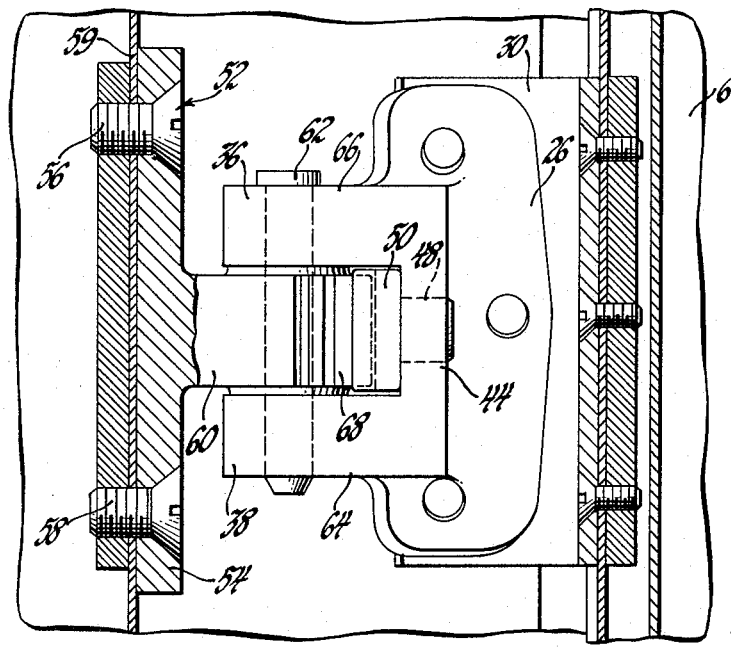
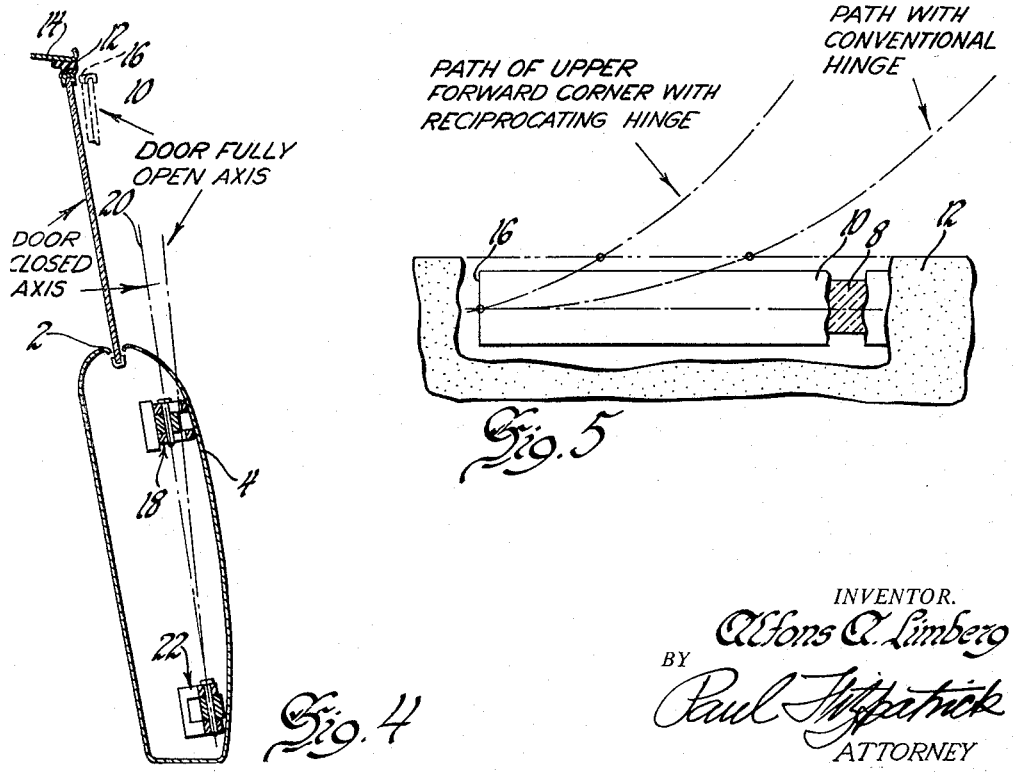
INVENTOR.
Alfons A. Limberg
BY Paul Fitzpatrick
ATTORNEY United States Patent Office 2,959,808
Patented Nov. 15, 1960

2,959,808

RECIPROCATING DOOR HINGE

Alfons A. Limberg, Grosse Pointe, Mich., assignor to General Motors Corporation, Detroit, Mich., a corporation of Delaware Filed June 28, 1956, Ser. No. 594,582

3 Claims. (Cl. 16—179)

This invention relates to hinge structure and more particularly to hinge structures for use in automotive vehicles.

Very recently the so-called four-door hardtop type of vehicle body has achieved extraordinary popularity. In this type of body construction, the conventional center door pillar extending between the floor and roof is eliminated so that when the vehicle door windows are lowered the entire side of the automobile above the belt line is unobstructed. In a typical case, the rear doors are hinged on a "stub" center pillar which rises from the floor only to the level of the body belt line. One of the problems presented by vehicle body construction of this type is that when the rear door windows are up, the forward upper edges thereof tend to rub against the roof rail weather strip during initial opening movement of the door.

An object of the present invention is to provide an improved door hinge.

Another object is to provide, in a vehicle body of the type referred to, a door hinge construction which eliminates abrasive rubbing between the door window frame and the adjacent roof rail weather strip.

A further object is to provide a vehicle door which is so hinged that upon opening thereof the upper portion of the door tends to tilt laterally outwardly.

Still a further object is to provide a door hinging structure in which the hinge axis for the door swings progressively laterally outwardly as the door is rotated about the said axis.

A still further object is to provide a hinge in which the hinge pintle has bodily lateral movement responsive to opening and closing movement of the hinge.

Yet a further object is to provide a hinge of the stated character in which a gear and rack assembly is utilized to accomplish lateral translation of the hinge pintle.

A still further object is to provide a hinge of the type defined in which the rack is mounted on a relatively fixed portion of the hinge and the gear is mounted on a relatively movable portion of the hinge, the rack being so mounted as to permit rocking thereof in a plane effective to compensate for progressive change in the axis of rotation of the gear.

These and other objects, advantages and features of the invention will become more fully apparent as reference is had to the accompanying specification and drawings wherein:

Fig. 3 is a side elevational view, partly in section, of the hinge structure shown in Figures 1 and 2, taken on the line 3—3 of Fig. 1.

Fig. 4 is a sectional schematic view of a rear door employing the present invention, showing the angular change of the door hinge axis effected thereby during opening of the door; and Fig. 5 is a diagrammatic illustration showing comparative paths of the upper forward corner of the window during opening of the door.

Figure 1:
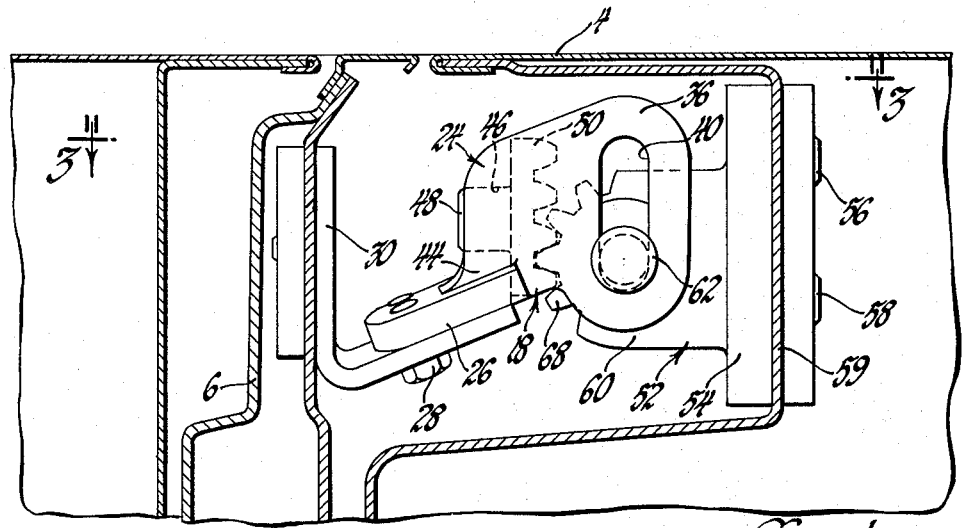
Fig. 1 is an enlarged fragmentary plan view, partly in section and with parts broken away, illustrating the form and arrangement of the hinge structure, the parts being shown in their relative positions when the vehicle door is closed.
Figure 2:
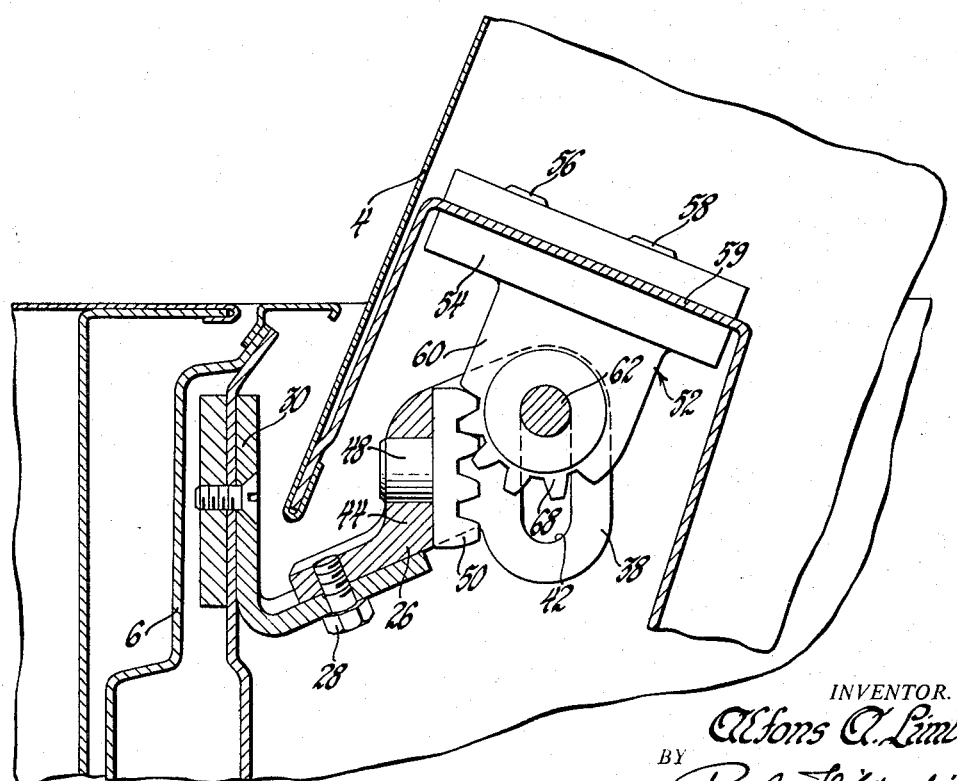
Fig. 2 is a view similar to Fig. 1 illustrating the relative position of the parts when the door is in open position.

Referring now to the drawings and particularly Fig. 4, there is illustrated a portion of a vehicle body generally illustrative of the type referred to as four-door hardtops in which the front and rear doors, respectively, terminate at the body belt line 2. In bodies of this type, the front door is hinged at its forward edge, not shown, to a forward body pillar, not shown, while the rear door 4 is hinged at its forward edge to a centrally disposed vertically extending stub pillar 6 (Figs. 1 and 2). Each of the doors are provided with the usual extensible side windows 8. When the windows are in the fully extended position, their upper edges 10 are adapted for lateral abutting engagement with the longitudinally extending weather strip 12 disposed along the terminal edge of roof rail 14 so as to effect a compression seal therewith. Since the front door is hinged on a vertical axis spaced well forward of the forward edge of the front door window, when the front door is opened, the upper edge of the front window immediately moves laterally outwardly from weather strip 14. However, due to the body configuration and the relative position of the rear door hinge axis, outward swinging movement of the rear door causes the upper forward corner 16 to rub against the adjacent weather strip during initial opening movement.

In order to eliminate the rubbing action of the forward corner of the rear door window and still retain positive compressive engagement between the window glass and weather strip when the door is in closed position, the upper hinge assembly 18 of rear door 4 is so formed as to cause the upper portion of the door to tilt bodily laterally outwardly as it swings about the hinge axis 20 defined by upper hinge 18 and lower hinge 22. To accommodate this tilting action lower hinge 22 is required to tolerate a slight change in angular inclination of its hinge axis during such swinging movement. However, it has been found that conventional vehicle door hinge structures possess sufficient tolerance to accommodate this slight change since tolerances provided for in mass production manufacture result in some "sloppiness" in the fit of the hinge pintle. Therefore, it is to be understood that any conventional form of hinge may be employed at 22. Since such hinge structures are well known in the prior art, further description thereof will be omitted.

An upper hinge assembly constructed in accordance with the present invention is illustrated in Figs. 1, 2 and 3, wherein a female hinge member 24 is secured near the upper end of vehicle body stub pillar 6. Member 24 is provided with a butt plate 26 which is suitably attached, as by bolts 28, to a sheet metal bracket 30 on post 6. Integral with butt plate 30 are a pair of vertically spaced generally laterally extending ears 36 and 38. Formed in the mid portion of ears 36 and 38 are transversely extending elongated parallel slots 40 and 42. Extending between the forward edges of ears 36 and 38 is a vertical transversely extending web portion 44 having a bore 46 formed therein and directed longitudinally of the automobile. Disposed in bore 46 is a circular pilot portion 48 formed integrally on the rear surface of a generally rectangular toothed rack member 50. Rack member 50 is disposed against web 44 between ears 36 and 38 and extends transversely in parallel relation with the vertical plane of slots 40 and 42. A male hinge member 52 is provided with an integral butt plate 54 which is attached by bolts 56 and 58 to the forward vertical wall 59 of rear door 4 near the upper edge thereof. Integral with butt plate 54, male hinge member 52 is formed with a forwardly extending arm 60 which extends into the space between ears 36 and 38 of female hinge member 24. Centrally thereof, arm 60 is provided with a vertically directed aperture in which is press fitted a pintle member 62. Pintle member 62 is of sufficient length that the opposite ends thereof extend vertically beyond the upper and lower walls 64 and 66 of ears 36 and 38. Formed on the outer end of arm 60 in concentric relation with pintle 62 is a gear sector 68, the teeth of which mesh with the teeth of rack 50.

As will be evident from Figs. 1 and 2, when door 4 is swung from closed to open position, male hinge member 52 is caused to rotate in a counterclockwise direction while female hinge member 24 remains stationary. As member 52 rotates counterclockwise, sector 68 "walks" laterally outwardly along the rack 50. Since pintle 62 is connected to the portion of arm 60 on which sector 68 is formed, pintle 62 also progressively moves from an initial position at the inboard end of slots 40 and 42 to the outboard end thereof. Inasmuch as the effective axis of swing 20 of door 4 is determined by the location of pintle 62, it will be evident that the vertical axis of the door progressively tilts laterally outwardly (Fig. 4) as the door is opened. Because of this action, compressive engagement between the upper edge 10 of the window glass and the roof weather strip 12 will be quickly relieved by bodily lateral movement of the glass which accompanies swinging movement thereof.

In accordance with another feature of the invention, the rack 50 is so mounted that the teeth thereof may tilt progressively to correspond with the progressive tilting of the axis of sector teeth 68, and thus prevent binding action. As previously mentioned, rack 50 is connected to web 44 by circular pilot 48. Thus, although rack 50 is prevented from shifting bodily, it is free to rock about a longitudinal axis passing through the center of pilot 48 and thus adapt itself to correspond with the inclination of sector teeth 68 caused by progressive change in inclination of the axis of pintle 62.

While but one embodiment of the invention will be shown and described, it will be apparent that numerous changes and modifications may be made therein. It is, therefore, to be understood that it is not intended to limit the invention to the embodiment shown, but only by the scope of the claims which follow.

I claim:
1. A door hinge comprising a first member attachable to a fixed support, a second member attachable to a door, said first member being provided with spaced parallel vertically aligned slots extending transversely of said door, an arm on said second member extending into the space between said slots, a hinge pintle secured in said arm and projecting into said slots, a rack member pivotally mounted on said first member, and a pinion formed on said arm, said pinion engaging said rack whereby swinging movement of said door causes said hinge pintle to move progressively along said slots, the pivotal mounting of the rack member preventing binding between the rack and pinion.

2. Apparatus of the character claimed in claim 1, wherein the rack member is pivoted about an axis which is transverse to the direction of extent of said hinge pintle and to the direction of extent of the rack member.

3. A door hinge comprising a first member mounted on a fixed support, a second member mounted on a door, said first member being provided with spaced parallel vertically aligned slots extending transversely of said door, an arm on said second member extending into the space between said slots, a hinge pintle secured in said arm and projecting into said slots, a rack member pivotally mounted on said first member about an axis which is transverse to the direction of extent of said hinge pintle and to the direction of extent of the rack member, said rack member extending in a plane parallel with said slots, and a pinion formed on said arm, said pinion engaging said rack whereby progressive swinging movement of said door causes said hinge pintle to move progressively from one end of said slots to the other and the pivotal mounting of the rack member prevents binding between the rack and pinion.

References Cited in the file of this patent

UNITED STATES PATENTS

| 159,682 | Kauffman | Feb. 9, 1875 |
|---|---|---|
| 993,227 | De Rose | May 23, 1911 |
| 1,793,946 | McEwan | Feb. 24, 1931 |
| 2,153,541 | Atwood | Apr. 11, 1939 |
| 2,178,908 | Hudson | Nov. 7, 1939 |

FOREIGN PATENTS

| 496,917 | Great Britain | Dec. 8, 1938 |